United States Patent [19]

Park

[11] Patent Number: 4,931,019

[45] Date of Patent: Jun. 5, 1990

[54] ELECTROSTATIC IMAGE DISPLAY APPARATUS

[75] Inventor: Kyung T. Park, Berwyn, Pa.

[73] Assignee: Pennwalt Corporation, Philadelphia, Pa.

[21] Appl. No.: 239,258

[22] Filed: Sep. 1, 1988

[51] Int. Cl.$^5$ .................................................. B43L 1/00
[52] U.S. Cl. .................................. 434/409; 340/712; 310/311
[58] Field of Search ............... 434/409, 410; 340/712, 340/706; 310/311

[56] References Cited

U.S. PATENT DOCUMENTS

| | | | |
|---|---|---|---|
| 3,103,751 | 9/1963 | McDonald | 35/61 |
| 3,106,794 | 10/1963 | Le Goff | 40/28 |
| 3,426,453 | 2/1969 | Dingwall et al. | 35/61 |
| 3,648,269 | 3/1972 | Rosenweig et al. | 340/373 |
| 3,668,699 | 6/1972 | Vogelgesang et al. | 340/373 |
| 3,825,927 | 7/1974 | Passlen | 340/373 |
| 3,982,334 | 9/1976 | Tate | 35/66 |
| 4,103,341 | 7/1978 | Brody | 365/117 |
| 4,143,472 | 3/1979 | Murata et al. | 35/36 |
| 4,451,985 | 6/1984 | Pullman | 434/409 |
| 4,464,118 | 8/1984 | Scott et al. | 434/85 |
| 4,567,480 | 1/1986 | Blanchard | 340/712 |
| 4,639,720 | 1/1987 | Rympalski et al. | 340/712 |
| 4,643,684 | 2/1987 | Murata et al. | 434/409 |
| 4,689,614 | 8/1987 | Strachan | 340/712 |

Primary Examiner—Edward M. Coven
Assistant Examiner—Valerie Szczepanik
Attorney, Agent, or Firm—Seidel, Gonda, Lavorgna & Monaco

[57] ABSTRACT

An electrostatic image display apparatus which uses piezoelectric film to enable a user to form images on a screen. The apparatus is contained within a housing. Supported within the housing is a common electrode. A layer of piezoelectric film is separated a distance from the common electrode by a suspension medium. The suspension medium contains electrically charged pigmented particles, the color of which contrasts with the color of the suspension medium. The housing has an opening for applying localized pressure to one surface of the piezoelectric film. In addition, the apparatus has a source for energizing the common electrode to a preselected electric potential. By applying a force or infrared energy to an area of the piezoelectric film a charge accumules on the inner surface of the film, directly under the point of application of the force. This charge attracts the electrically charged pigmented particles in the suspension medium which are visible through the film and create an image display.

23 Claims, 2 Drawing Sheets

ELECTROSTATIC IMAGE DISPLAY APPARATUS

BACKGROUND OF THE INVENTION

The present invention is directed to a sketching apparatus. An apparatus of this type, which can be seen on the market today, is disclosed in U.S. Pat. No. 4,451,985. The apparatus disclosed in that patent enables the user to draw straight lines on a screen using a remotely controlled stylus located inside the device on the inaccessible side of the screen. The screen is transparent and has a coating covering its inaccessible side. The stylus etches away part of the coating, creating lines which are visible to the user through the transparent screen. The coating is generally a very fine powder which adheres to the inaccessible side of a transparent glass or plastic screen by surface tension. The part of the coating etched away during use can be restored after use, readying the device for fresh drawing.

The present invention enables the user to sketch images on a screen directly with a hand-held stylus rather than using a remotely controlled stylus. This gives the user better control over the creation of the screen images. In addition, whereas the prior art limits user to sketching straight lines with sharp corners, the present invention is capable of smooth, continuous lines and curves, allowing for creation of a more natural, aesthetic picture. The basic design of the invention lends itself to low cost manufacture and quick, easy assembly.

SUMMARY OF THE INVENTION

The present invention is a sketching apparatus which utilizes unmetallized piezoelectric film. The apparatus has an electrode means for causing migration of electrically charged pigmented particles suspended within a suspension medium sandwiched between the electrode means and a layer of transparent unmetallized piezoelectric film having an inner and an outer surface. A transparent support layer of transparent non-conductive, semi-rigid material is placed in contact with the inner surface of the piezoelectric film. The apparatus is contained in a housing comprising a bottom, sides and a top. The top has an open area, or screen, through which the outer surface of the piezoelectric film is accessible. A transparent coating is provided to cover and protect the outer surface of the piezoelectric film.

In its broad aspect, the invention is an electrostatic image display apparatus comprising a housing having electrode means supported within the housing, and a layer of piezoelectric film parallel to, and separated a distance from, the electrode means. The apparatus also has means for energizing the electrode means to a preselected electrical potential. Between the electrode means and the piezoelectric film is a suspension medium in which electrically charged pigmented particles are suspended. The housing has an opening, or screen, for providing access to one surface of the piezoelectric film.

In one embodiment, the apparatus has a writing-erasing means comprising a stylus and a thermal energy source. When the apparatus is in writing mode, the electrode means may be grounded, or left unconnected. When the apparatus is in full erase mode the electrode means is connected to a voltage source.

In writing mode, the user can apply either a force by, for example, using the stylus, or infrared energy directly to the piezoelectric film. This force causes the film to take on a polarized charge on the portion of film directly beneath the stylus. Pigmented particles having an opposite electrical charge and located in the suspension medium are attracted to the charged surface of the film. These particles are preferably of a contrasting color to the suspension medium, and therefore are readily seen through the piezoelectric film. By moving the stylus along the screen while applying force or infrared energy as described above, an image is created by the electrically charged pigmented particles which are attracted to the now oppositely charged area under the stylus. The pigmented particles remain in place until the image is erased.

An image created by using a force may be partially erased by bringing a thermal energy source, such as an infrared diode, close to the film. The thermal energy changes the polarity of the film. Thus the charged area of the film reverses polarity, and repels the electrically charged pigmented particles from the film. Complete erasure of the screen is accomplished by connecting the electrode means to a voltage source having a polarity opposite to that of the charged particles. This will cause the electrode means to become oppositely charged with respect to the charged particles. The charged electrode means will attract all of the oppositely charged pigmented particles in the suspension medium, including those clinging to the piezoelectric film, to it, thus completely erasing any image on the film.

An image created by using an infrared energy source may be partially or fully erased by applying a force directly to the area of piezoelectric film where the image to be erased is located. The applied pressure of the force causes a change in the surface charge density of the film and the film will repel the electrically charged pigmented particles which were drawn to it by using the infrared source.

DESCRIPTION OF THE DRAWINGS

For the purpose of illustrating the invention, there is shown in the drawings a form which is presently preferred; it being understood, however, that this invention is not limited to the precise arrangements and instrumentalities shown.

DESCRIPTION OF THE INVENTION

Figure 1:
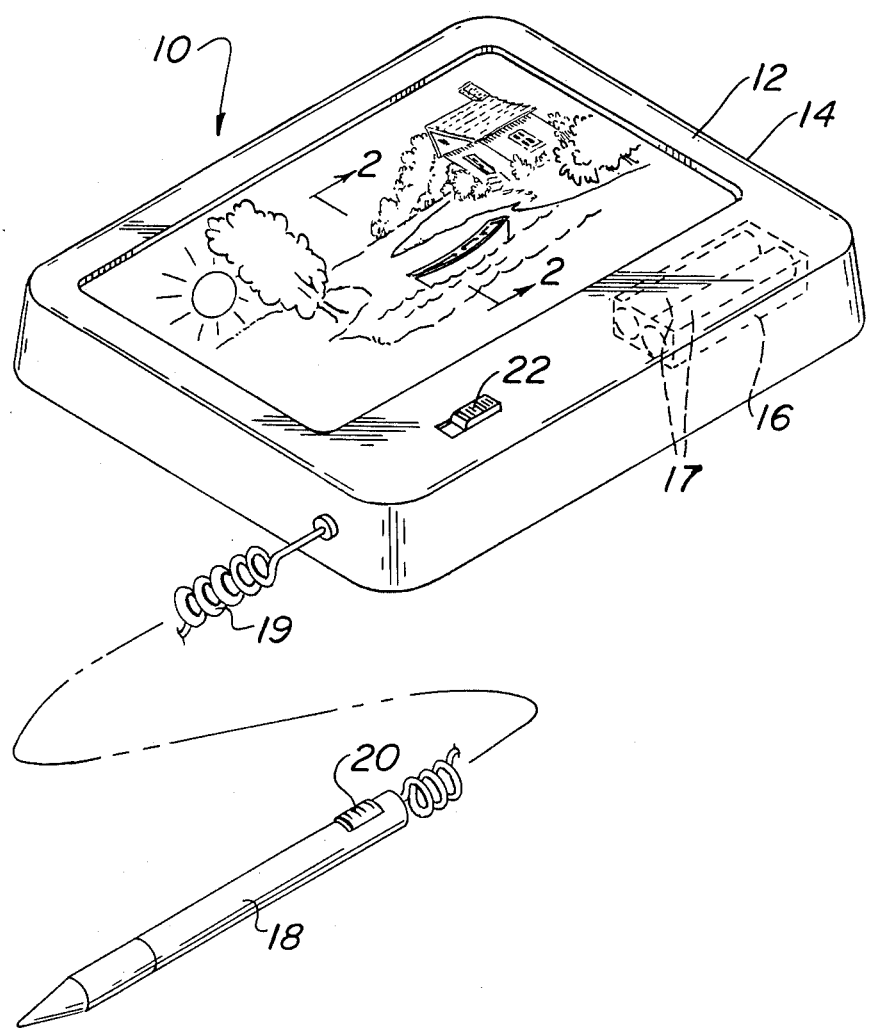
FIG. 1 is a perspective view of one embodiment of the electrostatic image display apparatus as constructed in accordance with the present invention.
Figure 5:
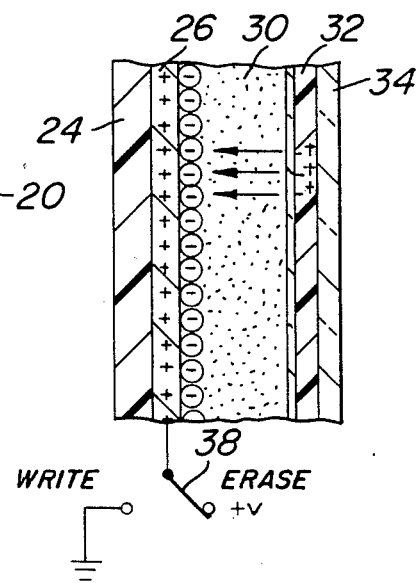
FIG. 5 is a cross-sectional elevational view, also in schematic form, taken along lines 2—2 of FIG. 1 illustrating the erase function of another embodiment of the electrostatic image display apparatus.

Referring now to the drawings, wherein like numerals indicate like elements, there is shown in FIG. 1 an electrostatic image display apparatus 10 according to the invention. The apparatus 10 comprises a housing 12 and a screen 14. Housing 12 has a battery compartment 16 and a switch 22. Switch 22 allows user to change the connection of a common electrode 26 (See FIG. 2) from ground to a positive voltage source (FIG. 5). The common electrode 26 is connected to ground and to the positive voltage source by leads (not shown). When the device is in the writing mode, common electrode 26 may be connected to ground, or it may be left unconnected. When the device is in full erase mode, common electrode 26 is connected to a voltage source, such as one or more batteries 17. Removably attached to the housing by a cord 19 is stylus 18. Stylus 18 has one end tapered to a point, and the opposite end may contain a thermal source 20 which can be, for example, an infrared source such as a semiconductor diode. If desired, thermal source 20 can be removable or separate from stylus 18.

Figure 2:
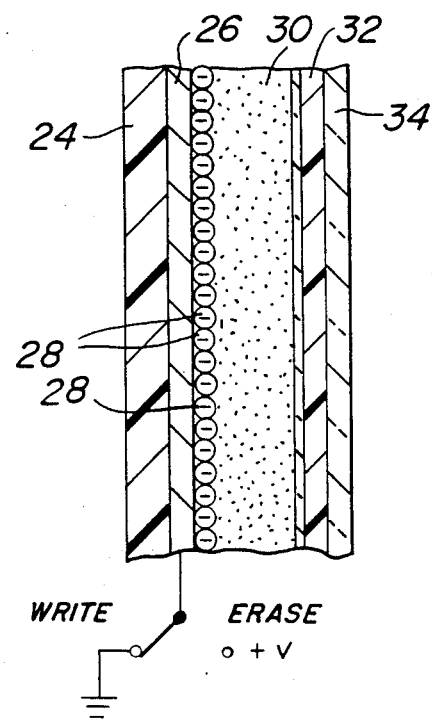
FIGS. 2 and 3 are cross-sectional elevational views, in schematic form, taken along lines 2—2 of FIG. 1 illustrating the electrostatic image display apparatus in writing mode.
Figure 3:
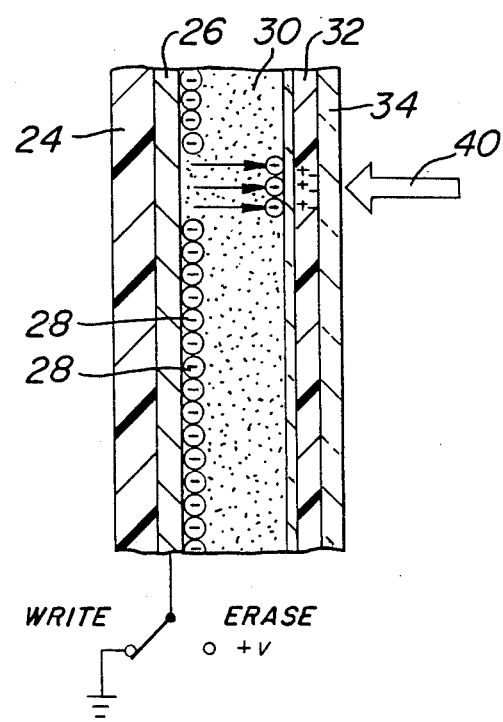
Figure 4:
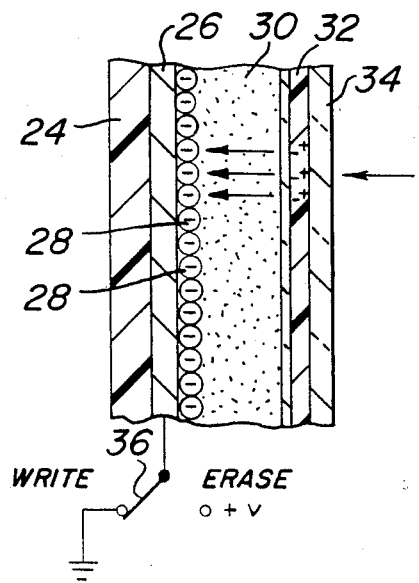
FIG. 4 is a cross-sectional elevational view, also in schematic form, taken along lines 2—2 of FIG. 1 illustrating the erase function for one embodiment of the electrostatic image display apparatus.

FIGS. 2 through 4 taken along cross-section 2—2 of FIG. 1 show the components of the apparatus 10 contained within the housing 12. Substrate 24 supports common electrode 26 and may be formed from any material suitable for supporting an electrode. Separated a distance from common electrode 26 is a layer of piezoelectric film 32 having an inner and outer surface. As is commonly understood in the art, piezoelectric film is polar. Therefore, when the film is stressed, or when infrared radiation is applied to the film, it will develop a predominantly positive charge on one surface and a predominantly negative charge on the opposite surface. In the invention, the film can be layered with either surface (positive or negative) facing the common electrode 26. For convenience the invention is described as having its positive potential surface as its inner surface, that is, the surface facing electrode 26. A transparent support layer 31 of transparent non-conductive, semi-rigid material, is placed in contact with the inner surface of the piezoelectric film. Spacing between common electrode 26 and piezoelectric film 32 may be established and maintained by a rectangular frame (not shown), which may also act as a seal to contain a suspension medium 30, discussed below.

Film 32 may be any piezoelectric polymer material, and is preferably a resinous piezoelectric film of vinylidene fluoride homopolymer or a copolymer of vinylidene fluoride and one or more copolymerizable monomers, referred to as PVDF. Sandwiched between and in face contact with common electrode 26 and the support layer 31 is a suspension medium 30. Because film 32 is layered with its positive potential surface facing medium 30, negatively charged pigmented particles 28 are suspended in the suspension medium 30. However, it should be understood that if the negative potential surface of film 32 is facing medium 30, positive charged pigmented particles would be suspended in medium 30. The pigmented particles 28 are of a contrasting color to the suspension medium 30. A protective transparent covering 34 is placed over the exterior surface of the piezoelectric film 32. Covering 34 may be a transparent metallic coating such as Indium Tin Oxide to eliminate interference caused by environmental noise.

In use, when writing mode is selected, the common electrode 26 may either be connected to ground, or it may be left unconnected. A force 40 is applied directly to the piezoelectric film 32 through the protective covering 34 (See FIG. 2). The force 40 may be applied with the stylus 18. When an external force 40 is applied to piezoelectric film, the resulting film deformation causes a change in the surface charge density of the film, and the film develops an electrical charge on its surface. That charge is proportional to the change in mechanical stress on the film due to applied force 40. The force 40 creates a polarized charge on the piezoelectric film 32 in the area directly beneath the applied force, so that the inner surface of piezoelectric film 32, becomes positively charged at the point of application of the force. The positive charge is created only on that area of the film to which the force 40 was directly applied.

As seen in FIG. 3, the positively charged piezoelectric film 32 attracts the negatively charged pigmented particles 28 to the piezoelectric film 32. The negatively charged pigmented particles 28 are visible through the transparent support layer 31 and piezoelectric film 32 and the transparent protective covering 34.

Because of the flexible nature of piezoelectric film, when force 40 is applied directly to unsupported film 32 the force will tend to deform the film for a small radius around the point of application. As a result, the film will develop a charge not only at the point of application but for a small area around it as well, and hence particles 28 will be attracted to both the point of application of force 40 and to the surrounding area. This tends to create a fuzzy image. To improve resolution of the image, transparent support layer 31 is placed between suspension medium 30 and film 32. Support layer 31 may be any non-conductive transparent material such as a layer of glass or similar firm surface. The firm surface will minimize deformation of the film except at the point where the force is applied.

A thermal source 20 can be used for partial erasure of the image on the screen, as shown in FIG. 4. As is known, electric polarization of the piezoelectric film can be changed by subjecting it to thermal radiation, and the change in polarization is proportional to the amount of thermal radiation absorbed by the film from the thermal source. Thus, the piezoelectric film is also pyroelectric and responds to thermal energy as well as mechanical force. The thermal source 20 is brought close to the screen 14 at the spot for desired erasure. The incident radiation of the thermal source 20 raises the temperature of the film over a small area, thereby inducing a change in the film polarity in the area in which the radiation penetrates the film. This change in polarity has the effect of repelling particles 28, causing them to detach from the screen 14 and move to the common electrode at the back of the apparatus.

Erasure of the total screen, as shown in FIG. 5, may be accomplished by actuating switch 22 to connect the common electrode 26 to a positive voltage source, for example batteries 17. This causes common electrode 26 to become positively charged, thus attracting all negatively charged pigmented particles 28 in the suspension medium 30 to the rear of the apparatus, including those particles forming the image on the screen. Alternately, the common electrode 26 could be connected to the positive side of the voltage source, i.e., the positive terminals of batteries 17, while the negative side is connected to transparent metallic coating 34, to fully erase the image.

In an alternate embodiment using the same principles and properties of piezoelectric film which were described above, an image may be created on the screen using an infrared stylus. Erasure of the image created by infrared radiation is accomplished through application of a force to the area on the screen where erasure is desired.

The present invention may be embodied in other specific forms without departing from the spirit or essential attributes thereof and, accordingly, reference should be made to the appended claims, rather than to the foregoing specifications, as indicating the scope of the invention.

I claim:

1. An electrostatic image display apparatus comprising:
   (a) a housing;
   (b) electrode means supported in the housing;
   (c) a layer of piezoelectric film parallel to, and separated a distance from, the electrode means arranged such that localized pressure on said layer will product localized electrical charges on said layer;
   (d) a suspension medium between the electrode means and the piezoelectric film, the medium containing electrically charged pigmented particles free to move towards said localized electrical charges;
   (e) an opening in the housing whereby said localized pressure may be applied to said piezoelectric film; and
   (f) means for selectably energizing the electrode means to a preselected electric potential in order to cause said pigmented particles to be removed from said piezoelectric film.

2. The apparatus of claim 1 wherein the electrode means is supported by a substrate.

3. The apparatus of claim 1 wherein the piezoelectric film is an unmetallized transparent piezoelectric film.

4. The apparatus of claim 1 wherein the piezoelectric film has a protective transparent metallic coating.

5. The apparatus of claim 4 wherein the metallic coating is indium tin oxide.

6. The apparatus of claim 4, wherein the piezoelectric film is supported by a transparent semi-rigid support means.

7. An electrostatic image display apparatus comprising:
   (a) a housing;
   (b) electrode means in the housing, supported by a substrate;
   (c) a layer of transparent piezoelectric film parallel to, and separated a distance from, the electrode means, said piezoelectric film having a protective transparent metallic coating on its outer surface and being supported by transparent semi-rigid support means on its inner surface, arranged such that localized pressure on said layer will product localized electrical charges on said layer;
   (d) a suspension medium between the electrode means and the piezoelectric film, the medium containing electrically charged pigmented particles free to move toward said localized electrical charges;
   (e) an opening in the housing whereby said localized pressure may be applied to said piezoelectric film; and
   (f) user-actuatable switch means for selectably energizing the electrode means to a preselected electric potential in order to cause said pigmented particles to be removed from said piezoelectric film.

8. The apparatus of claim 7, wherein the housing comprises a base, sides and a top, said top having said opening whereby said localized pressure may be applied to said piezoelectric film.

9. The apparatus of claim 7, wherein the protective transparent metallic coating is on the outer surface of the piezoelectric film.

10. The apparatus of claim 7, wherein the support means is a sheet of glass.

11. The apparatus in claim 7, further comprising means for selectably applying a localized pressure to the selected portions of the outer surface of the piezoelectric film.

12. The apparatus of claim 7, wherein the electrically charged pigmented particles are of a color which contrasts with the color of the suspension medium.

13. The apparatus of claim 11, wherein the means for applying a pressure to the outer surface of the piezoelectric film comprises a stylus movably attached to the housing.

14. The apparatus of claim 13 further comprising means for selectably applying thermal energy to selected portions of the outer surface of the piezoelectric film.

15. The apparatus of claim 14, wherein the means for selectably applying thermal energy is in the stylus.

16. The apparatus of claim 15, wherein the means for selectably applying thermal energy is removable from the stylus.

17. The apparatus of claim 14 wherein the means for selectably applying thermal energy comprises a source of infrared radiation.

18. The apparatus of claim 17 wherein the source of infrared radiation is a semiconductor diode.

19. An electrostatic image display apparatus comprising:
   (a) a housing having a base, sides and a top;
   (b) an electrode supported in the housing by a substrate, the electrode being connected to a selectably operable switch for switching the electrode between a ground potential and a non-zero potential, and a means for energizing the electrode to a non-zero potential;
   (c) a layer of transparent piezoelectric film comprising an inner surface and an outer surface, said piezoelectric film being parallel to and separated a distance from the electrode means, and having a protective transparent metallic coating on the outer surface and a transparent semi-rigid support means on its inner surface, arranged such that localized pressure on said layer will produce localized electrical charges on said layer;
   (d) a suspension medium containing electrically charged pigmented particles, said particles being of a color which contrasts with the color of the suspension medium, said suspension medium being located between and in face contact with the electrode means and the inner surface of the piezoelectric film, said particles free to move towards said localized electrical charges;
   (e) the housing top having an opening whereby said localized pressure may be applied to said piezoelectric film; and
   (f) means for selectably applying a localized force to selected portions of the piezoelectric film, said means comprising a stylus movably attached to the housing.

20. The apparatus of claim 19 wherein the means for energizing the electrode to a non-zero potential is a positive voltage source.

21. The apparatus of claim 19, wherein the positive voltage source comprises at least one battery.

22. The apparatus of claim 19, further comprising means on the stylus for selectably applying thermal energy to selected portions of the surface of the piezoelectric film.

23. The apparatus of claim 22, wherein the means for selectably applying thermal energy comprises an infrared semiconductor diode.

* * * * *